June 29, 1937.   E. A. BIBLE   2,085,247
MEASURING DEVICE
Filed July 18, 1936   2 Sheets-Sheet 2
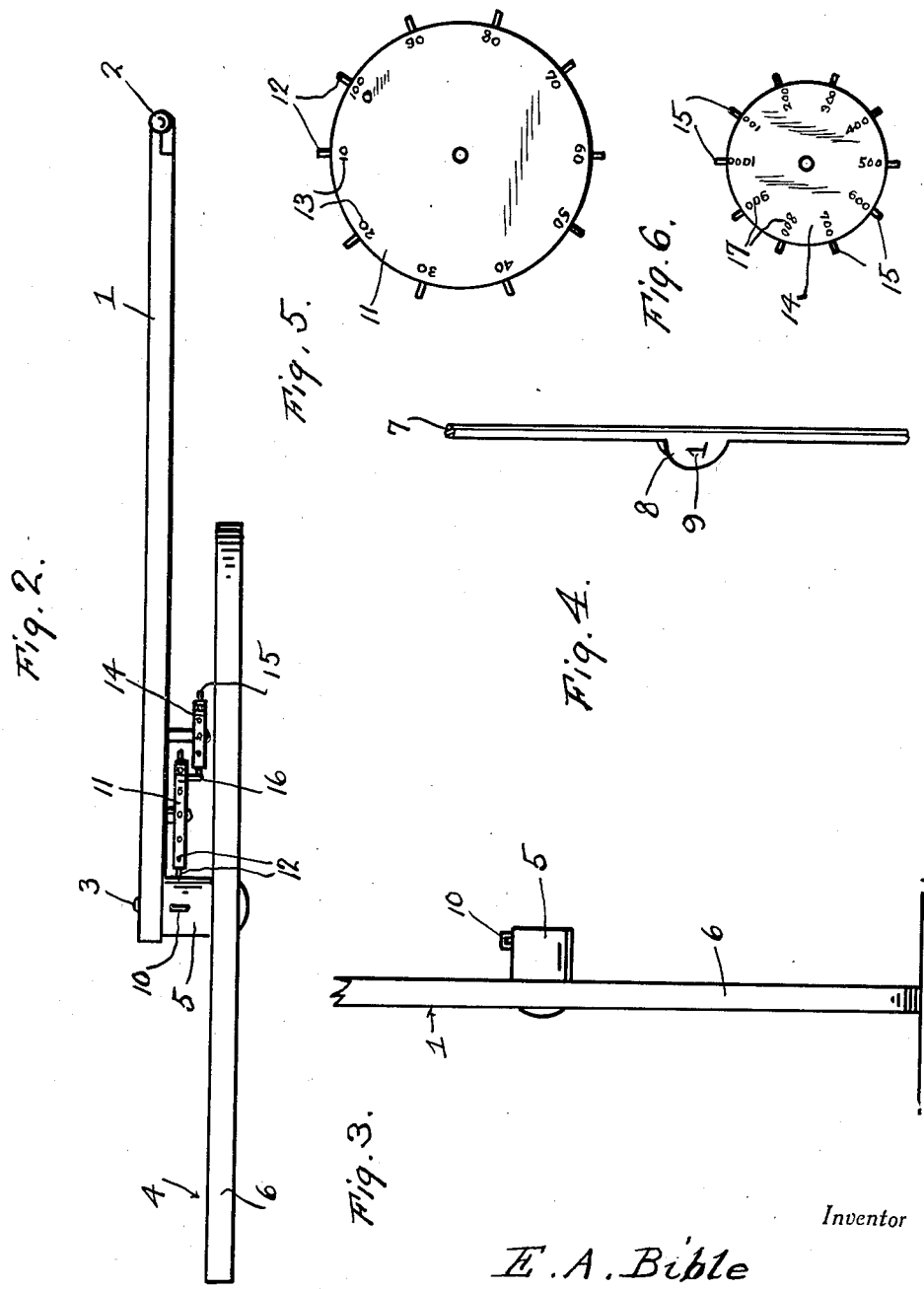
Inventor
*E. A. Bible*
By *Clarence A. O'Brien*
*Hyman Berman*
Attorneys Patented June 29, 1937

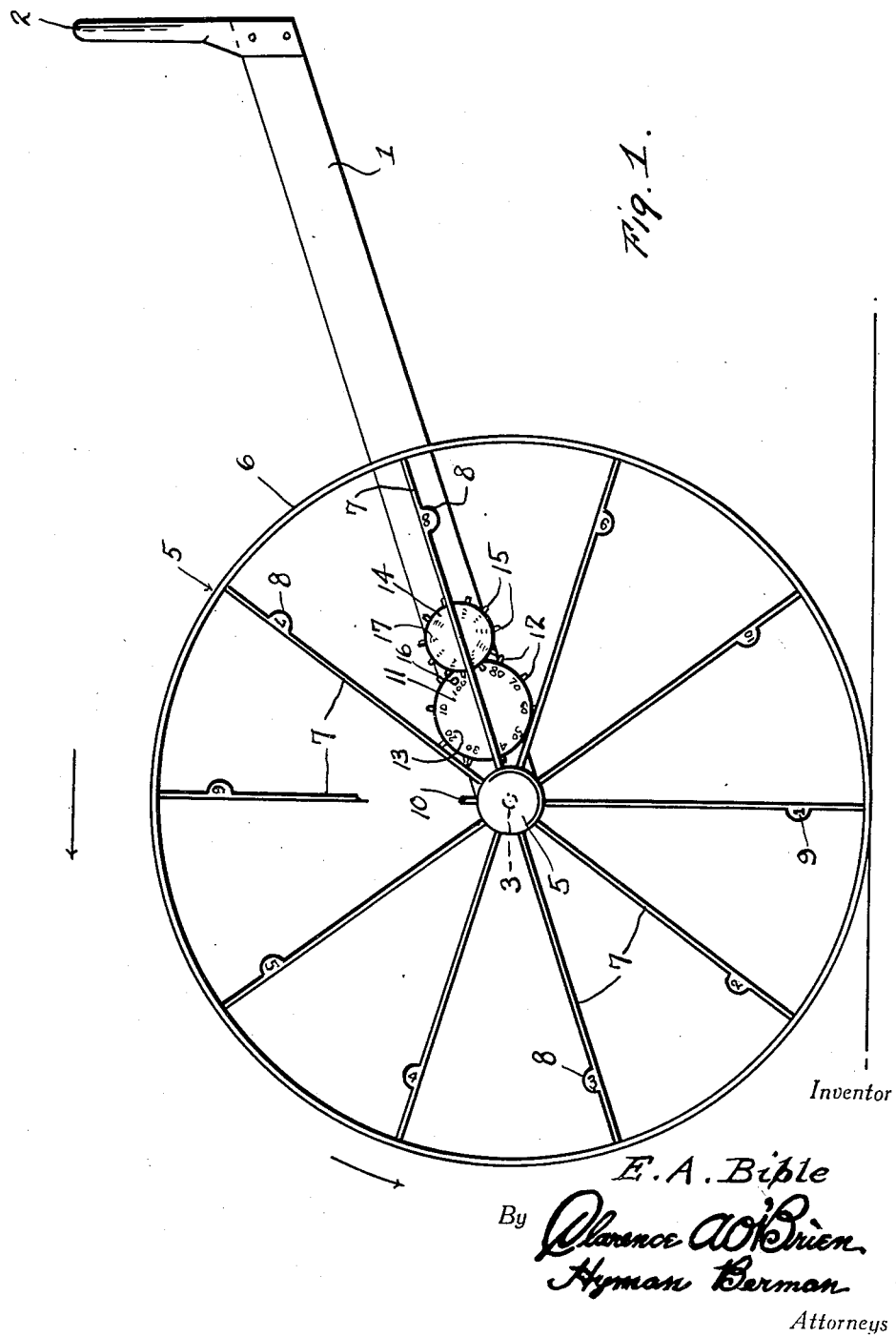

2,085,247

UNITED STATES PATENT OFFICE 2,085,247

MEASURING DEVICE

Edwin A. Bible, Midway, Tenn.

Application July 18, 1936, Serial No. 91,388

2 Claims. (Cl. 33—141)

The present invention relates to new and useful improvements in land measuring devices and has for its primary object to provide, in a manner as hereinafter set forth, an apparatus of this character which will accurately measure land by simply rolling said apparatus over the ground.

Other objects of the invention are to provide a land measuring device of the aforementioned character, which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a land measuring device constructed in accordance with the present invention, one of the spokes of the ground wheel being broken away.

Figure 2 is a view in top plan of the invention.

Figure 3 is a fragmentary view in front elevation of the ground wheel.

Figure 4 is a perspective view of a portion of one of the spokes of the ground wheel.

Figures 5 and 6 are detail views in side elevation of the computing disks, which are actuated by the ground wheel.

Referring now to the drawings in detail, it will be seen that the embodiment of the invention which has been illustrated comprises a bar 1 of any suitable length and material. Fixed on one end portion of the bar 1 is an upstanding handle 2. Projecting laterally from the other end portion of the bar 1 is a spindle 3.

Mounted on the spindle 3 is a ground wheel which is designated generally by the reference numeral 4. The ground wheel 4 includes a hub 5 and a rim 6. Extending between the hub 5 and the rim 6 are radial equi-distantly spaced spokes 7. Projecting laterally from the outer portions of the spokes 7 are ears 8 which are numbered consecutively from 1 to 10, inclusive, as at 9. In the embodiment shown, the ground wheel 4 is 10 feet in circumference and the outer ends of the spokes 7 are 1 foot apart.

Anchored in the hub 5 of the ground wheel 4 is a staple constituting a substantially U-shaped lug 10. Journaled on one side of the bar 1 adjacent the hub 5 is a disk 11 from the periphery of which equi-distantly spaced radial pegs 12 project. The pegs 12 correspond in number to the spokes 7. It may be well to here state that the pegs 12 are adapted to be successively engaged by the lug 10 in a manner to permit the ground wheel 4 to intermittently actuate the disk 11. As best seen in Figure 5 of the drawings, the disk 11 is provided with numerals from 10 to 100, as at 13, for indicating feet.

Also journaled on the bar 1 and extending adjacent one side of the disk 11 is a comparatively small disk 14 from the periphery of which equi-distantly spaced radial pegs 15 project. The pegs 15 correspond in number to the pegs 12 and the spokes 7. The disk 14 is intermittently actuated by the disk 11 through the medium of a laterally projecting pin 16 on said disk 11 which is engageable with the pegs 15. The disk 14 is numbered from 100 to 1000, as at 17.

It is thought that the operation of the device will be readily apparent from a consideration of the foregoing. The operator grasps the handle 2 and rolls the apparatus over the land to be measured. As the wheel 4 travels over the ground, the lug 10, upon the completion of each revolution of said wheel, engages one of the pegs 12 and moves the disk 11 around one step. It will thus be seen that ten complete revolutions of the wheel 4 will turn the disk 11 one revolution. In this manner the number of feet less than 100, which the machine travels, may be ascertained. With each complete revolution of the disk 11, the pin 16 engages one of the lugs 15 and rotates the disk 14 a step. Thus, ten complete revolutions of the disk 11 will rotate the disk 14 one complete revolution. The number of feet traveled by the machine between 100 and 1000 may be ascertained by observing the disk 14. If desired, suitable stationary points or indicators may be associated with the disks 11 and 14.

It is believed that the many advantages of a land measuring device constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:

1. A land measuring device of the class described comprising a bar, an upstanding handle fixed on one end portion of said bar, a spindle projecting laterally from the other end portion of said bar, a wheel rotatably mounted on the spindle, said wheel including a hub journaled on the spindle, a rim, and equi-distantly spaced radial spokes extending between said hub and said rim, laterally projecting numbered ears on the spokes, a substantially U-shaped lug projecting from the hub, computing disks journaled on the bar, means connecting one of said disks to the other of said disks for intermittent actuation thereby, and pegs on said other disk engageable by the lug for intermittently actuating said other disk.

2. A land measuring device comprising a handle bar, a ground wheel journaled on one side of said bar including a hub, spokes radiating from said hub and spaced apart at their outer ends to represent a unit of linear measurement, lugs on said spokes numbered consecutively, a counting disk rotatably mounted on said bar for step-by-step movement and having equi-distantly spaced peripheral pegs, a lug on said hub cooperating with said pegs to impart a step of movement to said disk during each revolution of said wheel, a second counting disk also rotatably mounted on said bar for step-by-step movement, and cooperating devices on said disks for imparting a step of movement to the second disk during each revolution of the first-mentioned disk, said steps of movement of the first and second mentioned disks representing ten and one-hundred foot units of measurement, respectively, and said disks each being marked to indicate successive units of measurement thereon.

EDWIN A. BIBLE.